(12) United States Patent
Shiraishi et al.

(10) Patent No.: US 8,737,018 B2
(45) Date of Patent: May 27, 2014

(54) SPINDLE MOTOR AND DISK DRIVE APPARATUS

(71) Applicant: Nidec Corporation, Kyoto (JP)

(72) Inventors: Masahiro Shiraishi, Kyoto (JP); Kazuhiro Sato, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/804,855

(22) Filed: Mar. 14, 2013

(65) Prior Publication Data

US 2014/0086036 A1    Mar. 27, 2014

Related U.S. Application Data

(60) Provisional application No. 61/703,843, filed on Sep. 21, 2012.

(51) Int. Cl.
  *G11B 17/02*        (2006.01)
(52) U.S. Cl.
  USPC ............................................. 360/99.08
(58) Field of Classification Search
  CPC ....................................................... G11B 17/20
  USPC ............................................................ 360/99.08
  See application file for complete search history.

(56) References Cited

U.S. PATENT DOCUMENTS

| 7,154,704 | B2 * | 12/2006 | Sheu | 360/99.08 |
| 8,315,011 | B2 * | 11/2012 | Nishitani | 360/99.08 |
| 8,599,516 | B2 * | 12/2013 | Nishitani | 360/99.08 |

* cited by examiner

*Primary Examiner* — Mark Blouin
(74) *Attorney, Agent, or Firm* — Keating & Bennett, LLP

(57) ABSTRACT

A spindle motor includes a stationary portion and a rotating portion including a rotor hub, and includes a recording disk and a clamper mounted thereon. The rotor hub includes a hub circular plate portion whose outer circumferential portion includes a hub slanting surface, and a hub cylindrical portion whose outer circumferential portion includes a hub screw portion. The hub screw portion, to which the clamper is screwed, includes at least a first hub screw groove, a first hub screw thread arranged to be adjacent to the first hub screw groove, and upper and lower flanks arranged to together define the first hub screw thread. The hub slanting surface connects with the first hub screw groove. The length of the hub slanting surface is longer than the length of the upper flank.

21 Claims, 7 Drawing Sheets

SPINDLE MOTOR AND DISK DRIVE APPARATUS

BACKGROUND OF THE INVENTION

1. Field of the Invention

The present invention relates to a spindle motor and more specifically to a spindle motor included in a disk drive apparatus.

2. Description of the Related Art

A spindle motor arranged to rotate a disk is installed in a disk drive apparatus. A known spindle motor and a known disk drive apparatus are described, for example, in JP-A 2001-35129. In the disk drive apparatus described in JP-A 2001-35129, a disk is adhered to a spacer whose inner circumferential portion includes a screw groove defined therein, and this spacer is screwed to an outer circumferential portion of a hub, the outer circumferential portion including a screw groove defined therein, whereby the disk is fixed to the hub (see paragraph [0014] of JP-A 2001-35129).

In the case where a fixing member including a screw groove defined therein is screwed to a hub including a screw groove defined therein as in the disk drive apparatus described in JP-A 2001-35129, the fixing member is mounted on the hub, and is then screwed to the hub by rotating the fixing member. At this time, if the fixing member is not stably mounted on the hub, the fixing member may be screwed to an outer circumferential portion of the hub in a tilted condition. This may result in a failure to securely fix a disk to the hub. There is accordingly a demand for the fixing member to be stably mounted on the hub.

SUMMARY OF THE INVENTION

A first preferred embodiment of the present invention is directed to a spindle motor capable of having a recording disk and a clamper mounted thereon. The spindle motor includes a rotating portion arranged to be rotatable about a central axis, and a stationary portion. The rotating portion includes a rotor hub and a rotor magnet including the rotor hub fixed thereto. The stationary portion includes a stator arranged opposite to the rotor magnet.

The rotor hub includes a hub circular plate portion, a hub cylindrical portion, and a disk mount portion. The hub circular plate portion is arranged to extend radially with respect to the central axis. The hub cylindrical portion is arranged to extend axially downward from an outer circumferential portion of the hub circular plate portion. The disk mount portion is arranged to extend radially outward from the hub cylindrical portion. An outer circumferential portion of the hub cylindrical portion includes a hub screw portion including the clamper screwed thereto.

The hub screw portion includes at least a first hub screw groove, a first hub screw thread arranged to be adjacent to the first hub screw groove, and upper and lower flanks arranged to together define the first hub screw thread. The outer circumferential portion of the hub circular plate portion includes a hub slanting surface arranged to connect with the first hub screw groove. A length of the hub slanting surface is preferably longer than a length of the upper flank.

According to the first preferred embodiment of the present invention, the rotor hub includes the hub slanting surface above the hub screw portion. In addition, the length of the hub slanting surface is longer than the length of the upper flank of the first hub screw thread. This leads to a larger area of contact between the clamper and the rotor hub when the clamper is screwed to the rotor hub, and to stable mounting of the clamper on the rotor hub when the clamper is screwed to the rotor hub. Moreover, a reduction in the likelihood that the clamper will be fitted to the rotor hub in a tilted condition is achieved.

A second preferred embodiment of the present invention is directed to a disk drive apparatus capable of having a recording disk mounted thereon. The disk drive apparatus includes a spindle motor arranged to rotate the recording disk, a clamper, a head, a head actuator mechanism, and a housing member. The clamper is fixed to the spindle motor to support the recording disk. The head is arranged to perform at least one of reading and writing of information from or to the recording disk. The head actuator mechanism is arranged to move the head relative to the recording disk and the spindle motor. The housing member is arranged to surround the recording disk, the spindle motor, the head, and the head actuator mechanism.

The spindle motor includes a rotating portion arranged to be rotatable about a central axis, and a stationary portion. The rotating portion includes a rotor hub and a rotor magnet having the rotor hub fixed thereto. The stationary portion includes a stator arranged opposite to the rotor magnet.

The rotor hub includes a hub circular plate portion, a hub cylindrical portion, and a disk mount portion. The hub circular plate portion is arranged to extend radially with respect to the central axis. The hub cylindrical portion is arranged to extend axially downward from an outer circumferential portion of the hub circular plate portion. The disk mount portion is arranged to extend radially outward from the hub cylindrical portion. An outer circumferential portion of the hub cylindrical portion includes a hub screw portion arranged to have the clamper screwed thereto. The hub screw portion includes at least a first hub screw groove, a first hub screw thread arranged to be adjacent to the first hub screw groove, and upper and lower flanks arranged to together define the first hub screw thread. The outer circumferential portion of the hub circular plate portion includes a hub slanting surface arranged to connect with the first hub screw groove. An inner circumferential portion of the clamper includes a clamper slanting surface. A length of the hub slanting surface preferably is equal to, substantially equal to, or longer than a length of the clamper slanting surface.

According to the second preferred embodiment of the present invention, the rotor hub includes the hub slanting surface above the hub screw portion. In addition, the length of the hub slanting surface preferably is equal to, substantially equal to, or longer than the length of the clamper slanting surface. This leads to a larger area of contact between the clamper and the rotor hub when the clamper is screwed to the rotor hub, and to more stable mounting of the clamper on the rotor hub when the clamper is screwed to the rotor hub. Moreover, a reduction in the likelihood that the clamper will be fitted to the rotor hub in a tilted condition is achieved.

A third preferred embodiment of the present invention is directed to a spindle motor arranged to have a recording disk and a clamper mounted thereon. The spindle motor includes a rotating portion arranged to be rotatable about a central axis, and a stationary portion. The rotating portion includes a rotor hub and a rotor magnet having the rotor hub fixed thereto. The stationary portion includes a stator arranged opposite to the rotor magnet.

The rotor hub includes a hub circular plate portion, a hub cylindrical portion, and a disk mount portion. The hub circular plate portion is arranged to extend radially with respect to the central axis. The hub cylindrical portion is arranged to extend axially downward from an outer circumferential portion of the hub circular plate portion. The disk mount portion is arranged to extend radially outward from the hub cylindrical portion. The hub circular plate portion includes a hub slanting surface arranged to extend obliquely radially inward and axially upward. The hub cylindrical portion includes a hub screw portion arranged to have the clamper screwed thereto.

At least at a portion of a circumferential extent of the rotor hub, an outer end of an upper surface of the hub circular plate portion and an inner top end of the hub slanting surface are joined to each other, while an outer bottom end of the hub slanting surface and an upper end of the hub screw portion are joined to each other.

According to the third preferred embodiment of the present invention, the rotor hub includes the hub slanting surface above the hub screw portion. This leads to stable mounting of the clamper on the rotor hub when the clamper is screwed to the rotor hub. Moreover, a reduction in the likelihood that the clamper will be fitted to the rotor hub in a tilted condition is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that directions parallel to or substantially parallel to a central axis of a spindle motor are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially". It is also assumed herein that a vertical direction is the axial direction, and that a side on which a recording disk is arranged with respect to a base member of the spindle motor is defined as an upper side. The shape of each member or portion and relative positions of different members or portions will be described based on the above assumptions. It is also assumed herein that an upper side and a lower side along the central axis of the spindle motor are referred to simply as an upper side and a lower side, respectively. It should be noted, however, that the above definitions of the vertical direction and the upper and lower sides should not be construed to restrict relative positions or directions of different members or portions when they are actually installed in a device.

Also note that the term "parallel" as used herein includes both parallel and substantially parallel directions. Also note that the term "perpendicular" as used herein includes both perpendicular and substantially perpendicular directions.

Also note that the term "flank" as used herein refers to a portion inadvertently described as a "crank" in the provisional application upon which this application is based.

Figure 1:
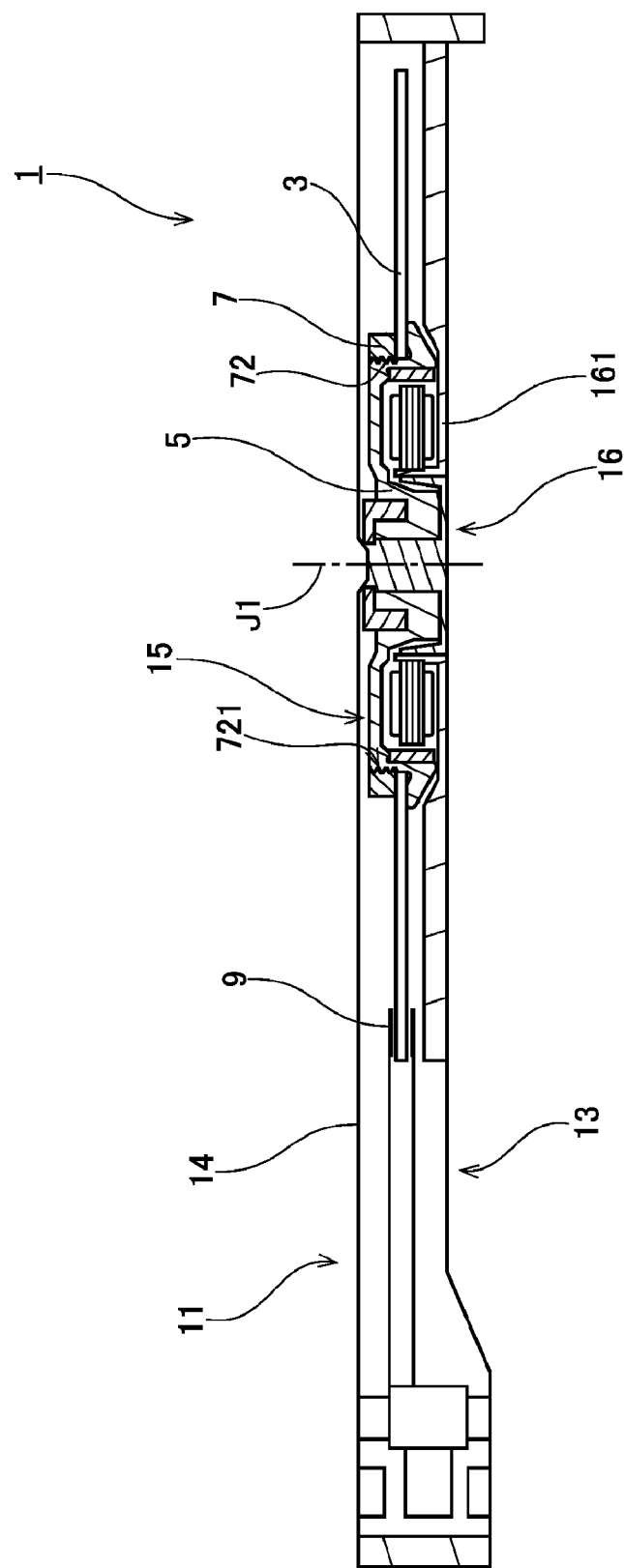
FIG. 1 is a cross-sectional view of a disk drive apparatus according to a preferred embodiment of the present invention.

FIG. 1 is a cross-sectional view of a disk drive apparatus 1 according to a first preferred embodiment of the present invention. The disk drive apparatus 1 is arranged to perform reading and/or writing of information from or to a recording disk 3 while rotating the recording disk 3. Referring to FIG. 1, the disk drive apparatus 1 preferably includes a spindle motor 5 arranged to rotate the recording disk 3, a clamper 7, heads 9, a head actuator mechanism 11, a housing member 13, and a cover 14.

The recording disk 3 is supported by a rotating portion 15 of the spindle motor 5. The rotating portion 15 will be described below. Once the spindle motor 5 is driven, the recording disk 3 is caused to rotate together with the rotating portion 15. The recording disk 3 is axially positioned by being held between the clamper 7 and a rotor hub 17 of the spindle motor 5. The rotor hub 17 will be described below.

The spindle motor 5 is arranged to rotate the recording disk 3 about a central axis J1 while supporting the recording disk 3. Referring to FIG. 1, the spindle motor 5 includes the rotating portion 15 and a stationary portion 16 including a base member 161. The base member 161 defines a portion of the housing member 13, and is preferably defined integrally with a remaining portion of the housing member 13 by a single monolithic member.

The clamper 7 is arranged to support the recording disk 3. The clamper 7 preferably includes a "clamper inner circumferential surface" 72 in an inner circumferential portion thereof. The clamper inner circumferential surface 72 is an annular or substantially annular inner circumferential surface of the clamper 7. Referring to FIG. 1, the clamper inner circumferential surface 72 preferably includes a clamper screw portion 721 defined therein. That is, the clamper 7 includes a clamper screw groove in the clamper inner circumferential surface 72. The clamper screw portion 721 of the clamper 7 and a hub screw portion 177 of the rotor hub 17 are screwed to each other such that the clamper 7 is fixed to the spindle motor 5. The hub screw portion 177 will be described below. The clamper 7 is thus fixed to the spindle motor 5 to support the recording disk 3.

Each head 9 is arranged to perform at least one of reading and writing of information from or to the recording disk 3. The head actuator mechanism 11 is arranged to move each head 9 relative to the recording disk 3 and the spindle motor 5. The head 9 is thus caused to move along a recording surface of the recording disk 3. Note that, although the number of recording disks 3 mounted on the spindle motor 5 according to the present preferred embodiment is preferably one, the number of recording disks 3 mounted on the spindle motor 5 may alternatively be more than one, for example.

The housing member 13 is preferably arranged to surround the recording disk 3, the spindle motor 5, the heads 9, and the head actuator mechanism 11. The cover 14 is arranged to cover an upper opening of the housing member 13. Specifically, the rotating portion 15 of the spindle motor 5, the recording disk 3, the clamper 7, the heads 9, and the head actuator mechanism 11 are accommodated in a case defined by the cover 14 and the housing member 13 including the base member 161 of the spindle motor 5.

Figure 2:
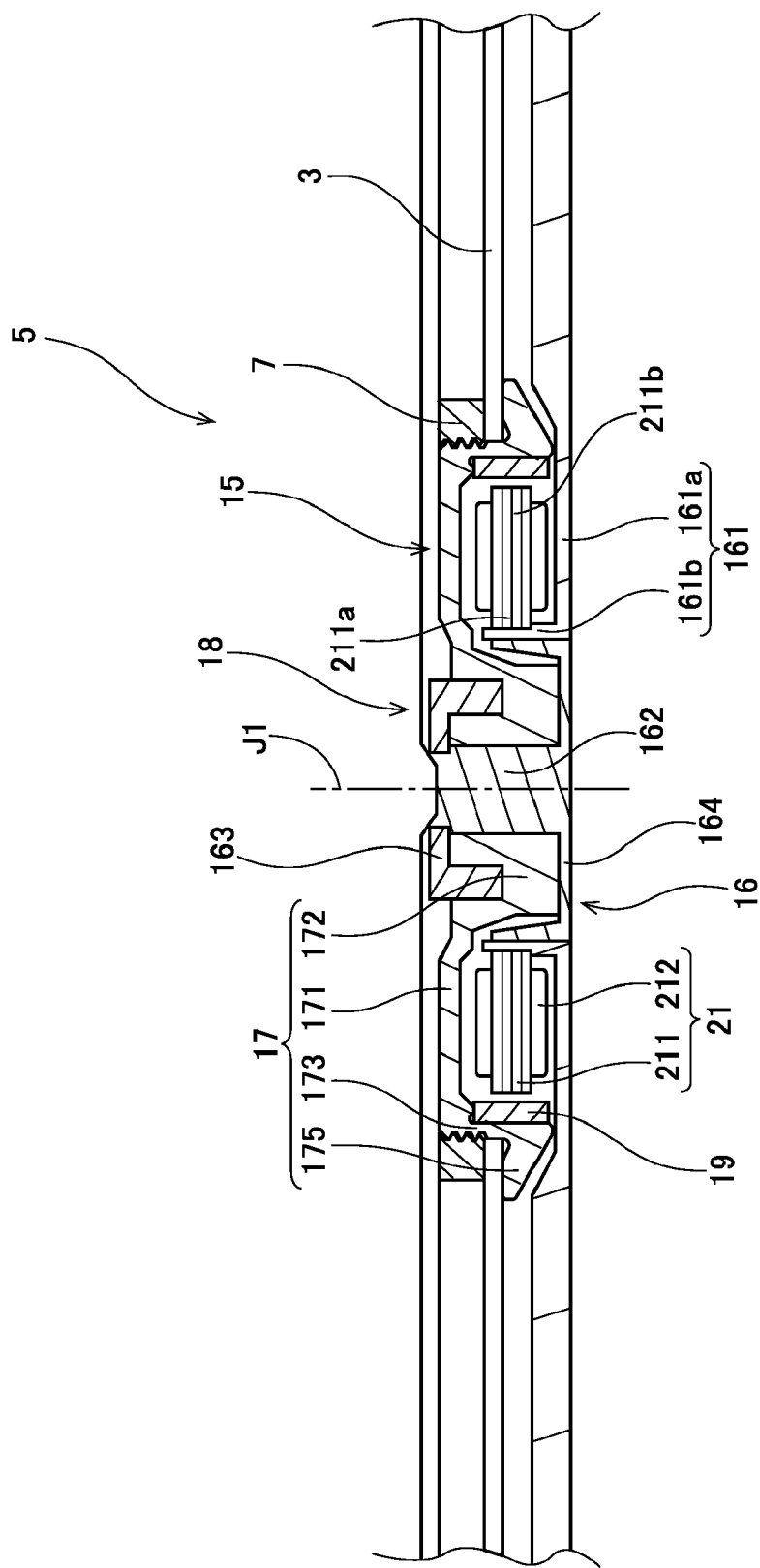
FIG. 2 is a cross-sectional view of a spindle motor according to a preferred embodiment of the present invention.
Figure 3:
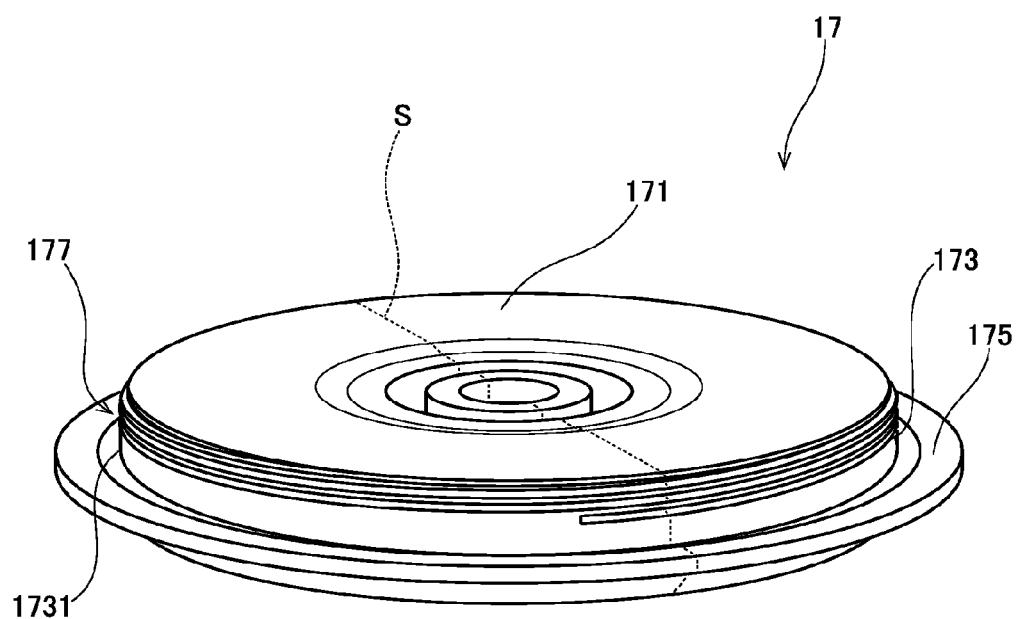
FIG. 3 is a perspective view of a rotor hub according to a preferred embodiment of the present invention.
Figure 4:
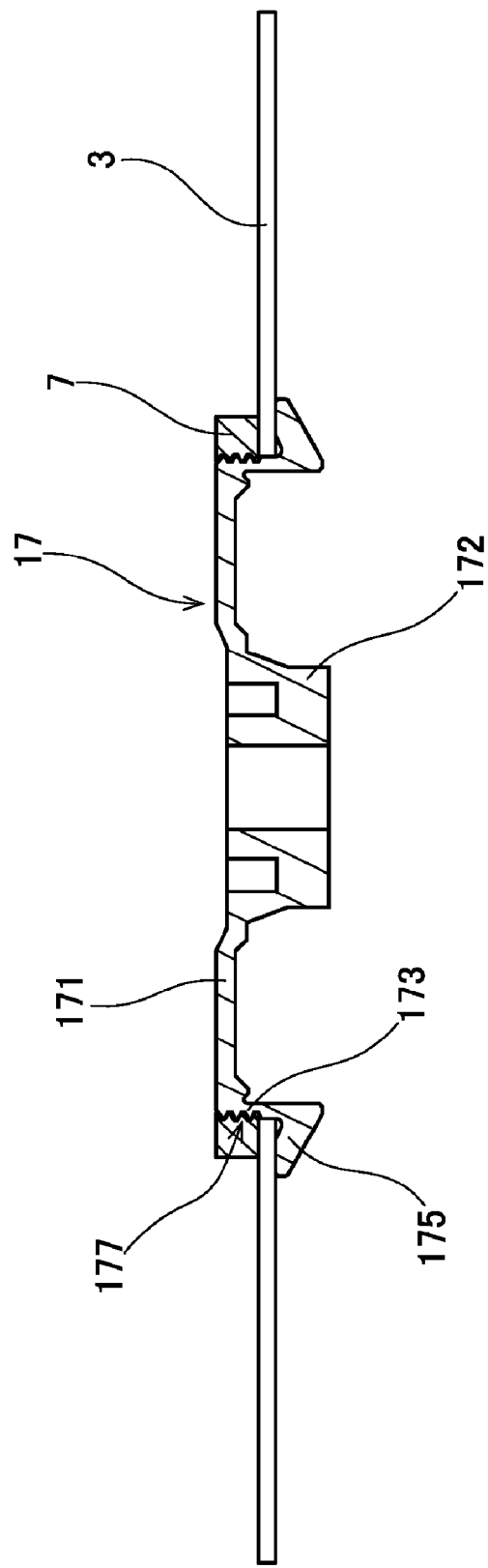
FIG. 4 is a cross-sectional view of the rotor hub, a recording disk, and a clamper according to a preferred embodiment of the present invention.
Figure 5:
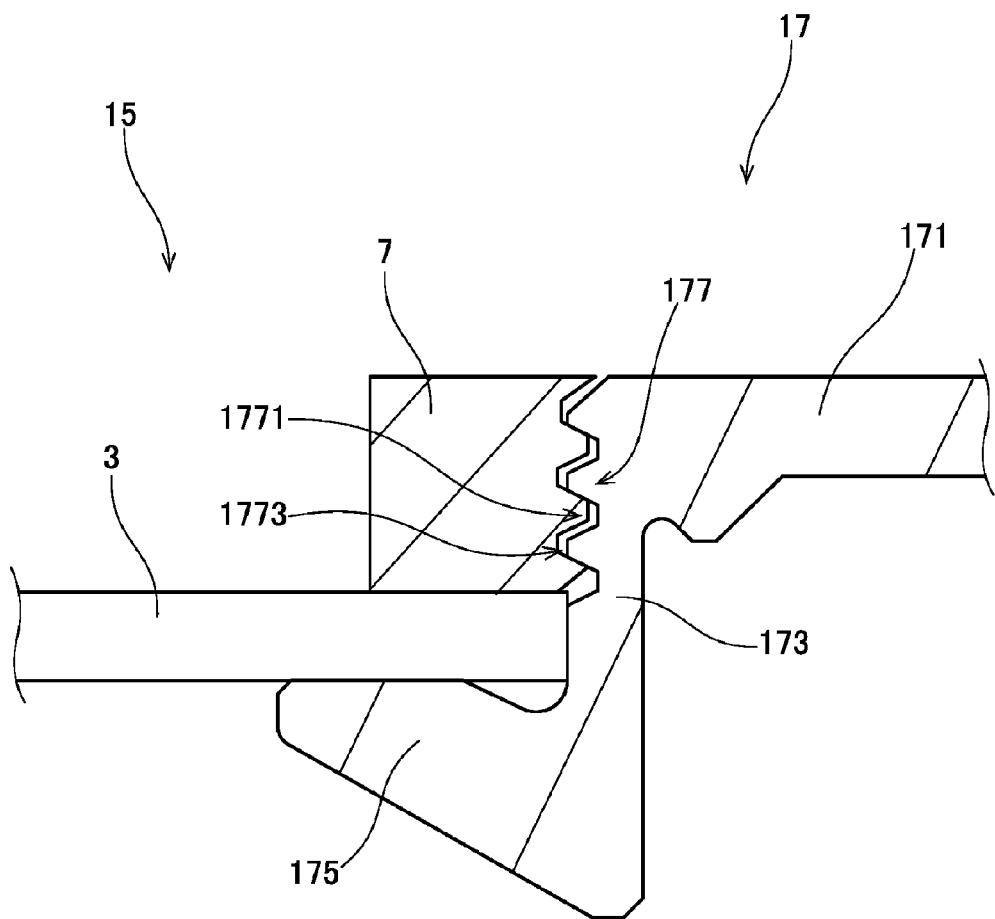
FIG. 5 is a cross-sectional view illustrating a portion of FIG. 4 in an enlarged form.

Next, the structure of the above-described spindle motor 5 will now be described below. FIG. 2 is a cross-sectional view of the spindle motor 5. FIG. 3 is a perspective view of the rotor hub 17. A section S including the central axis J1 is represented by a broken line in FIG. 3. FIG. 4 is a cross-sectional view illustrating the rotor hub 17, the recording disk 3, and the clamper 7 in the section S. FIG. 5 is a cross-sectional view illustrating a portion of FIG. 4 in an enlarged form.

Referring to FIG. 2, the recording disk 3 and the clamper 7 are mounted on the spindle motor 5. The spindle motor 5 includes the rotating portion 15 and the stationary portion 16. The rotating portion 15 includes the rotor hub 17 and a rotor magnet 19 fixed to the rotor hub 17. The rotating portion 15 is arranged to be rotatable about the central axis J1. The stationary portion 16 is fixed to the housing member 13 of the disk drive apparatus 1. The stationary portion 16 preferably includes the base member 161, a shaft 162, an upper annular portion 163, a lower annular portion 164, and a stator 21 arranged opposite to the rotor magnet 19.

The rotor hub 17 is supported around the shaft 162 such that the rotor hub 17 is rotatable about the central axis J1. The rotor hub 17 is preferably made of, for example, a metal such as stainless steel. Referring to FIGS. 3, 4, and 5, the rotor hub 17 preferably includes a hub circular plate portion 171, a sleeve portion 172, a hub cylindrical portion 173, and a disk mount portion 175.

The hub circular plate portion 171 is arranged to extend radially with respect to the central axis J1. The sleeve portion 172 is arranged to extend in the axial direction around the shaft 162 to assume a cylindrical or substantially cylindrical shape. An upper end portion of an outer circumferential surface of the sleeve portion 172 is joined to an inner edge of the hub circular plate portion 171. The sleeve portion 172 is arranged axially between the upper annular portion 163 and the lower annular portion 164. The hub cylindrical portion 173 is arranged to extend axially downward from an outer circumferential portion of the hub circular plate portion 171. Referring to FIG. 4, an outer circumferential portion of the hub cylindrical portion 173 includes the hub screw portion 177, to which the clamper 7 is screwed. The structure of the hub screw portion 177 and its vicinity will be described below. The disk mount portion 175 is arranged to extend radially outward from the hub cylindrical portion 173.

Referring to FIG. 2, at least a portion of an outer circumferential surface of the hub cylindrical portion 173 is arranged to define a contact surface arranged to contact an inner circumferential surface of the recording disk 3. An upper surface of the disk mount portion 175 is arranged to define a mounting surface on which the recording disk 3 is mounted. The recording disk 3 is mounted on the upper surface of the disk mount portion 175. The clamper 7 is arranged on an upper side of the recording disk 3. This contributes to preventing axial displacement of the recording disk 3. An inner circumferential portion of the recording disk 3 is arranged to be in contact with the outer circumferential surface of the hub cylindrical portion 173. Thus, the radial position of the recording disk 3 is fixed. Thus, the hub cylindrical portion 173, the disk mount portion 175, and the clamper 7 are arranged to together define a support portion arranged to support the recording disk 3.

The rotor magnet 19 is arranged radially outside the stator 21, and is fixed to an inner circumferential surface of the hub cylindrical portion 173. The rotor magnet 19 according to the present preferred embodiment is preferably annular and centered on the central axis J1. An inner circumferential surface of the rotor magnet 19 is arranged radially opposite a radially outer end surface of each of a plurality of teeth 211b, which will be described below. In addition, the inner circumferential surface of the rotor magnet 19 includes north and south poles arranged that alternate with each other in a circumferential direction.

Note that, in place of the annular rotor magnet 19, a plurality of magnets may be used. In the case where the plurality of magnets are used, the magnets are arranged in the circumferential direction such that north and south poles alternate with each other.

The base member 161 is arranged to extend in directions perpendicular to the central axis J1 below the stator 21, the rotating portion 15, the recording disk 3, and the heads 9. The base member 161 is preferably made of, for example, a metal such as an aluminum alloy. The base member 161 preferably includes a flat plate portion 161a arranged to extend radially, and a cylindrical or substantially cylindrical holder portion 161b arranged to project upward from an inner edge portion of the flat plate portion 161a. The base member 161 is preferably defined integrally with the housing member 13 of the disk drive apparatus 1 as a single monolithic member. Note that the base member 161 and the housing member 13 may alternatively be defined by separate members.

The shaft 162 is arranged to extend along the central axis J1. The shaft 162 is preferably made of, for example, a metal such as stainless steel. An upper end portion of the shaft 162 is fixed to the cover 14 of the disk drive apparatus 1. Meanwhile, a lower end portion of the shaft 162 is fixed to the holder portion 161b of the base member 161 through the lower annular portion 164.

The upper annular portion 163 is an annular or substantially annular member fixed to an outer circumferential surface of the shaft 162. An inner circumferential surface of the upper annular portion 163 is preferably fixed to the outer circumferential surface of the shaft 162 through, for example, press fitting, shrink fitting, adhesion, or by any other desirable fixing method. The upper annular portion 163 is preferably made of, for example, a metal including copper as a main component or of a resin. Note that the shaft 162 and the upper annular portion 163 may be defined integrally with each other as a single monolithic member if so desired.

The lower annular portion 164 is an annular or substantially annular member arranged below the upper annular portion 163. The lower annular portion 164 is arranged to project radially outward from the lower end portion of the shaft 162. In the present preferred embodiment, the shaft 162 and the lower annular portion 164 are preferably defined integrally with each other as a single monolithic member. Note that the shaft 162 and the lower annular portion 164 may alternatively be defined by separate members, if so desired. An outer circumferential surface of the lower annular portion 164 is fixed to an inner circumferential surface of the holder portion 161b of the base member 161.

The stator 21 preferably includes a stator core 211 and a plurality of coils 212. The stator core 211 is defined, for example, by laminated steel sheets, that is, electromagnetic steel sheets, such as silicon steel sheets, placed one upon another in the axial direction. The stator core 211 preferably includes an annular or substantially annular core back 211a and the teeth 211b, which are arranged to project radially outward from the core back 211a. The core back 211a is fixed to an outer circumferential surface of the holder portion 161b. Each coil 212 is preferably defined by a conducting wire wound around a separate one of the teeth 211b.

The rotating portion 15 is supported through a bearing mechanism 18 to be rotatable with respect to the stationary portion 16. In the present preferred embodiment, the bearing mechanism 18 is preferably a fluid bearing mechanism defined by the shaft 162, the upper annular portion 163, the lower annular portion 164, the sleeve portion 172 of the rotor hub 17, and a lubricating fluid arranged between the sleeve portion 172 and a combination of the shaft 162, the upper annular portion 163, and the lower annular portion 164. Note that, in place of the fluid bearing mechanism, a bearing of another type, such as, for example, a ball bearing or a plain bearing, may be used.

Once drive currents are supplied to the coils 212 in the spindle motor 5 described above, magnetic flux is generated around each of the teeth 221b. Then, interaction between the magnetic flux of the teeth 221b and that of the rotor magnet 19 produces a circumferential torque between the stationary portion 16 and the rotating portion 15, so that the rotating portion 15 is caused to rotate about the central axis J1 with respect to the stationary portion 16. The recording disk 3 supported by the rotor hub 17 is caused to rotate about the central axis J1 together with the rotating portion 15.

Figure 6:
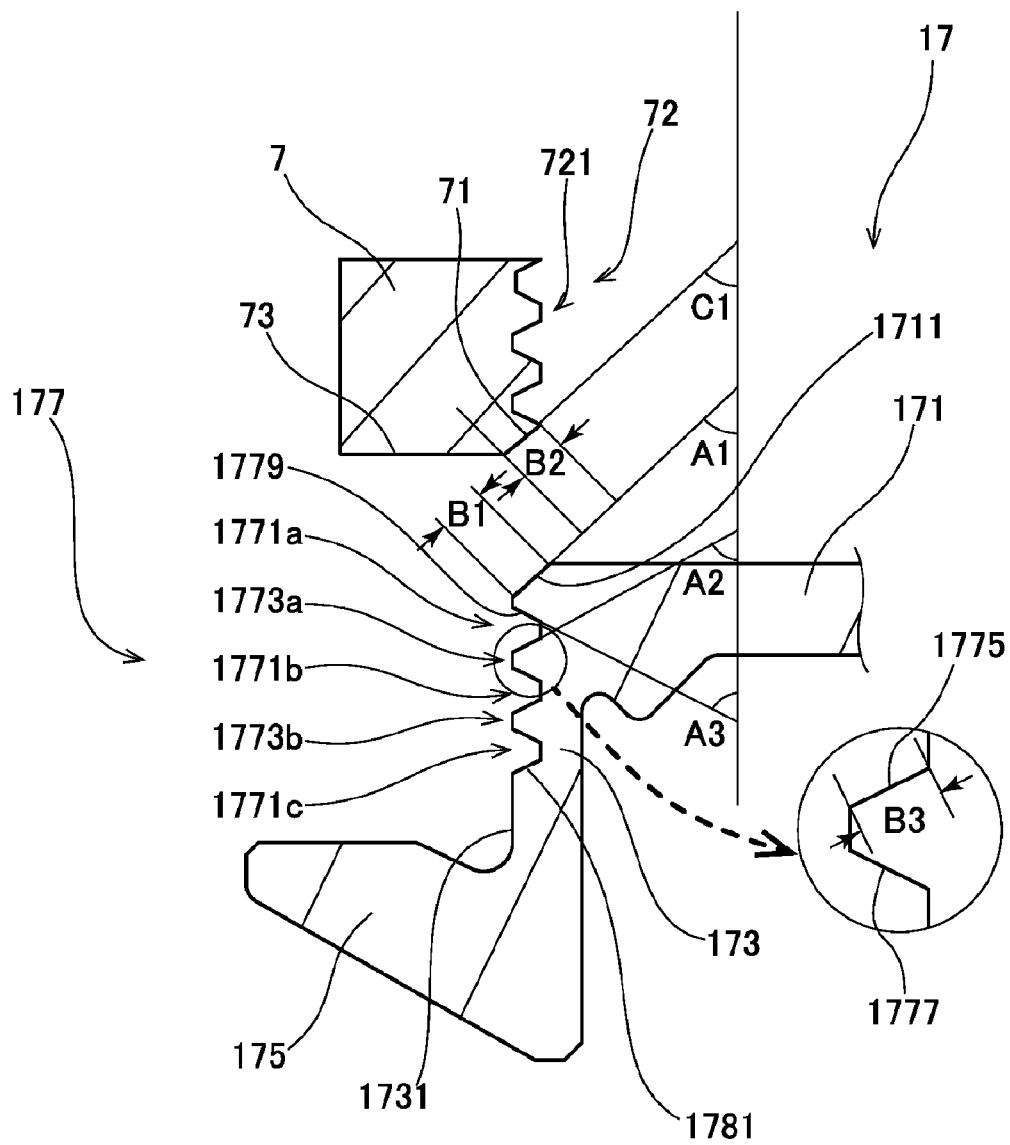
FIG. 6 is a cross-sectional view of the rotor hub and the clamper according to a preferred embodiment of the present invention.

Next, fixing of the rotor hub 17 and the clamper 7 to each other will now be described below. FIG. 6 is a partial cross-sectional view illustrating the rotor hub 17 and the clamper 7 in the section S illustrated in FIG. 3 before the fixing of the rotor hub 17 and the clamper 7 to each other.

As described above, the outer circumferential portion of the hub cylindrical portion 173 includes the hub screw portion 177 to which the clamper 7 is screwed.

Referring to FIGS. 5 and 6, the hub screw portion 177 preferably includes at least a first hub screw groove 1771a and a first hub screw thread 1773a in the section S including the central axis J1. The first hub screw groove 1771a is recessed radially inward relative to a crest portion of the first hub screw thread 1773a. The first hub screw thread 1773a is arranged to project radially outward relative to an inner end portion of the first hub screw groove 1771a. The first hub screw thread 1773a includes an upper flank 1775 and a lower flank 1777. The first hub screw thread 1773a is adjacent to the first hub screw groove 1771a.

Referring to FIG. 6, in the present preferred embodiment, the hub screw portion 177 preferably further includes a second hub screw groove 1771b, a second hub screw thread 1773b, and a third hub screw groove 1771c. Referring to FIG. 5, note that each of the number of hub screw grooves 1771 and the number of hub screw threads 1773 included in any section of the rotor hub 17, the section including the central axis J1, is at least one, and may be two or more than two. However, each of the number of hub screw grooves 1771 and the number of hub screw threads 1773 included in any section of the rotor hub 17, the section including the central axis J1, is preferably two, three, or four, for example. This will ensure sufficient strength with which the rotor hub 17 and the clamper 7 are fixed to each other after the spindle motor 5 is assembled, and also contribute to reducing the axial thickness of the spindle motor 5.

That is, referring to FIG. 5, in the present preferred embodiment, the hub screw portion 177 preferably includes the plurality of hub screw grooves 1771 and the plurality of hub screw threads 1773 in the section S. The hub screw grooves 1771 of the hub screw portion 177 preferably include the first hub screw groove 1771a, the second hub screw groove 1771b, and the third hub screw groove 1771c. The hub screw threads 1773 include the first hub screw thread 1773a and the second hub screw thread 1773b. The first hub screw groove 1771a, the first hub screw thread 1773a, the second hub screw groove 1771b, the second hub screw thread 1773b, and the third hub screw groove 1771c are adjacent to one another, and are arranged in the order described above with the first hub screw groove 1771a at a top.

Each hub screw groove 1771 is recessed radially inward relative to a crest portion of each adjacent hub screw thread 1773. Each hub screw thread 1773 is arranged to project radially outward relative to an inner end portion of each adjacent hub screw groove 1771. Each hub screw thread 1773 preferably includes the upper flank 1775 and the lower flank 1777. The upper flank 1775 is arranged to extend obliquely radially inward and axially upward. The lower flank 1777 is arranged to extend obliquely radially inward and axially downward.

The hub screw portion 177 further includes an upper connecting surface 1779. The upper connecting surface 1779 is arranged to extend obliquely radially inward and axially downward. The upper connecting surface 1779 is arranged to define a wall surface of the first hub screw groove 1771a. The upper connecting surface 1779 is positioned on a lower side of a hub slanting surface 1711, and is arranged to connect with the hub slanting surface 1711. The hub slanting surface 1711 will be described below.

That is, the first hub screw groove 1771a is defined by the upper connecting surface 1779 and the upper flank 1775 of the first hub screw thread 1773a. The second hub screw groove 1771b is defined by the lower flank 1777 of the first hub screw thread 1773a and the upper flank 1775 of the second hub screw thread 1773b. The third hub screw groove 1771c is defined by the lower flank 1777 of the second hub screw thread 1773b and a lower connecting surface 1781. The lower connecting surface 1781 will be described below.

Referring to FIG. 5, in the present preferred embodiment, the hub screw portion 177 preferably includes three hub screw grooves 1771 including the first hub screw groove 1771a, and two hub screw threads 1773 including the first hub screw thread 1773a, in the section S. The hub screw portion 177 also preferably includes a plurality of hub screw grooves 1771 including the first hub screw groove 1771a and a plurality of hub screw threads 1773 including the first hub screw thread 1773a in another section of the rotor hub 17, the section including the central axis J1. The hub screw grooves 1771 and the hub screw threads 1773 are defined in the hub cylindrical portion 173. Each of the number of hub screw grooves 1771 and the number of hub screw threads 1773 is preferably two, three, or four, for example.

Moreover, referring to FIGS. 3 and 6, the hub cylindrical portion 173 includes a straight surface 1731. The straight surface 1731 is a cylindrical or substantially cylindrical surface parallel to the central axis J1. The straight surface 1731 is arranged below the hub screw portion 177. The hub screw portion 177 includes the lower connecting surface 1781. The lower connecting surface 1781 is arranged to connect with both the straight surface 1731 and the lower flank 1777 that is positioned at the lowest axial height out of all the lower flanks 1777.

Once the recording disk 3 is mounted on the upper surface of the disk mount portion 175, the inner circumferential surface of the recording disk 3 is opposed to the straight surface 1731. The recording disk 3 is arranged to be in contact with at least a portion of the straight surface 1731. The straight surface 1731 radially positions the recording disk 3. The disk mount portion 175 axially positions the recording disk 3. This contributes to preventing a displacement of the recording disk 3.

Referring to FIG. 6, the outer circumferential portion of the hub circular plate portion 171 includes the hub slanting surface 1711, which is arranged to connect with the first hub screw groove 1771a. The hub slanting surface 1711 is arranged to extend obliquely radially inward and axially upward. At least at a portion of a circumferential extent of the rotor hub 17, an outer end of an upper surface of the hub circular plate portion 171 and an inner top end of the hub slanting surface 1711 are joined to each other, while an outer bottom end of the hub slanting surface 1711 and an upper end of the hub screw portion 177 are joined to each other.

When the clamper 7 is screwed in and fixed to the rotor hub 17 in a process of assembling the spindle motor 5, the clamper 7 is first mounted on the rotor hub 17. At this time, a lower surface of the clamper 7 is brought into contact with the hub slanting surface 1711.

Referring to FIG. 6, in the section S including the central axis J1, the length B1 of the hub slanting surface 1711 is preferably longer than the length B3 of the upper flank 1775. Note that the length of the hub slanting surface refers to the length of the surface not including any portion of the hub screw groove. Also note that the lengths B1 and B3 refer to the length of the hub slanting surface 1711 and the length of the upper flank 1775, respectively, in the section S including the central axis J1. Also note that, in the case where the length B1 varies at different circumferential positions, it is enough that a maximum value of the length B1 should satisfy the aforementioned dimensional relationship. This ensures a large area of contact between the rotor hub 17 and the clamper 7 when the clamper 7 is screwed to the rotor hub 17, and also enables the clamper 7 to be stably mounted on the rotor hub 17 when the clamper 7 is screwed to the rotor hub 17. Moreover, a reduction in the likelihood that the clamper 7 will be attached to the rotor hub 17 in a tilted condition is achieved.

The hub slanting surface 1711 is preferably defined by a straight chamfer, but this is not essential to the present invention. For example, the hub slanting surface 1711 may alternatively be arranged to have a round section or a discontinuous section.

Referring to FIG. 6, in the section S including the central axis J1, the angle A1 of inclination of the hub slanting surface 1711 with respect to the central axis J1 is preferably smaller than the angle A2 of inclination of the upper flank 1775 with respect to the central axis J1. This makes it possible to secure a larger area of the hub slanting surface 1711 while reducing the radial dimension of the hub slanting surface 1711.

The angle A1 of the inclination of the hub slanting surface 1711 is preferably about 35 or more degrees and about 65 or less degrees, for example. Note that the angle A1 of the inclination of the hub slanting surface 1711 is, more preferably, about 45 degrees, for example. Meanwhile, the angle A2 of the inclination of the upper flank 1775 is preferably about 55 degrees or more and about 65 degrees or less, for example. Note that the angle A2 of the inclination of the upper flank 1775 is, more preferably, about 60 degrees, for example.

Moreover, the angle A1 of the inclination of the hub slanting surface 1711 with respect to the central axis J1 is preferably different from the angle A3 of inclination of the upper connecting surface 1779 with respect to the central axis J1. In the present preferred embodiment, the angle A1 of the inclination of the hub slanting surface 1711 with respect to the central axis J1 is preferably smaller than the angle A3 of the inclination of the upper connecting surface 1779 with respect to the central axis J1. This makes it possible to secure a larger area of the hub slanting surface 1711 while reducing the radial dimension of the hub slanting surface 1711. The angle A1 of the inclination of the hub slanting surface 1711 is preferably about degrees, for example, as described above. Meanwhile, the angle A3 of the inclination of the upper connecting surface 1779 is preferably about 60 degrees, for example.

Note that the angle A1 of the inclination of the hub slanting surface 1711 with respect to the central axis J1 may be greater than the angle A3 of the inclination of the upper connecting surface 1779 with respect to the central axis J1. In this case, the hub slanting surface 1711 becomes more horizontal than in the case where the angle A1 of the inclination of the hub slanting surface 1711 is equal to the angle A3 of the inclination of the upper connecting surface 1779. This enables the clamper 7 to be more stably mounted on the rotor hub 17 when the clamper 7 is screwed to the rotor hub 17.

The axial dimension of the first hub screw thread 1773a is preferably greater than the axial dimension of a thread defined by the hub slanting surface 1711 and the upper connecting surface 1779. This contributes to increasing the axial dimension of the hub screw portion 177. This in turn contributes to securing sufficient strength with which the rotor hub 17 and the clamper 7 are fixed to each other while achieving reductions in axial thickness of both the spindle motor 5 and the disk drive apparatus 1.

Referring to FIG. 6, the inner circumferential portion of the clamper 7 preferably includes a clamper slanting surface 71. The clamper slanting surface 71 is arranged to extend obliquely radially inward and axially upward.

In the present preferred embodiment, the inner circumferential portion of the clamper 7 preferably includes the clamper slanting surface 71 and the clamper inner circumferential surface 72. That is, the clamper 7 includes the clamper slanting surface 71, the clamper inner circumferential surface 72, which is cylindrical or substantially cylindrical, and a clamper bottom portion 73. The clamper slanting surface 71 is arranged to extend obliquely radially inward and axially upward. The clamper inner circumferential surface 72 includes the clamper screw portion 721. The clamper bottom portion 73 is arranged to extend radially. An inner end of the clamper bottom portion 73 and an outer bottom end of the clamper slanting surface 71 are joined to each other at least at a portion of a circumferential extent of the clamper 7. Moreover, an inner top end of the clamper slanting surface 71 and a lower end of the clamper screw portion 721 are joined to each other at least at a portion of the circumferential extent of the clamper 7.

Referring to FIG. 6, in the present preferred embodiment, the length B1 of the hub slanting surface 1711 preferably is equal or substantially equal to the length B2 of the clamper slanting surface 71. Both the length B1 of the hub slanting surface 1711 and the length B2 of the clamper slanting surface 71 are preferably about 0.2 mm, for example. Note that it is assumed herein that the wording "substantially equal length" allows for a tolerance of ±0.2 mm, for example. Also note that the lengths B1 and B2 refer to the length of the hub slanting surface 1711 and the length of the clamper slanting surface 71, respectively, in the section S including the central axis J1. Also note that, in the case where the lengths B1 and B2 vary at different circumferential positions, it is enough that the maximum value of the length B1 and a maximum value of the length B2 should satisfy the aforementioned dimensional relationship.

Arranging the length B1 of the hub slanting surface 1711 and the length B2 of the clamper slanting surface 71 to be equal or substantially equal to each other contributes to increasing the area of contact between the hub slanting surface 1711 and the clamper slanting surface 71 without changing the axial dimension of the hub slanting surface 1711, that is, increasing the area of contact between the hub slanting surface 1711 and the clamper slanting surface 71 without changing the axial dimension of the rotor hub 17. This enables the clamper 7 to be stably mounted on the rotor hub 17 before the clamper 7 is screwed to the rotor hub 17. That is, precise positioning is made possible when the clamper 7 is screwed to the rotor hub 17, making it possible to fit the clamper 7 to the rotor hub 17 with high precision. Accordingly, the clamper 7 is prevented from being fitted to the rotor hub 17 in a tilted condition. That is, the hub slanting surface 1711 is preferably arranged to guide the clamper slanting surface 71. This contributes to preventing the clamper 7 from being fitted to the rotor hub 17 in the tilted condition, and reducing the axial thickness of each of the spindle motor 5 and the disk drive apparatus 1.

The angle A1 of the inclination of the hub slanting surface 1711 with respect to the central axis J1 is preferably equal or substantially equal to an angle C1 of inclination of the clamper slanting surface 71 with respect to the central axis J1. This enables the hub slanting surface 1711 and the clamper slanting surface 71 to be easily brought into surface contact with each other. This enables the clamper 7 to be mounted and precisely positioned on the rotor hub 17 before the clamper 7 is screwed to the rotor hub 17. This contributes to preventing the clamper 7 from being fitted to the rotor hub 17 in the tilted condition. In the present preferred embodiment, both the angle A1 of the inclination of the hub slanting surface 1711 and the angle C1 of the inclination of the clamper slanting surface 71 are about 45 degrees, for example. Note that it is assumed herein that the wording "substantially equal angle" allows for a tolerance of ±3 degrees, for example.

Figure 7:
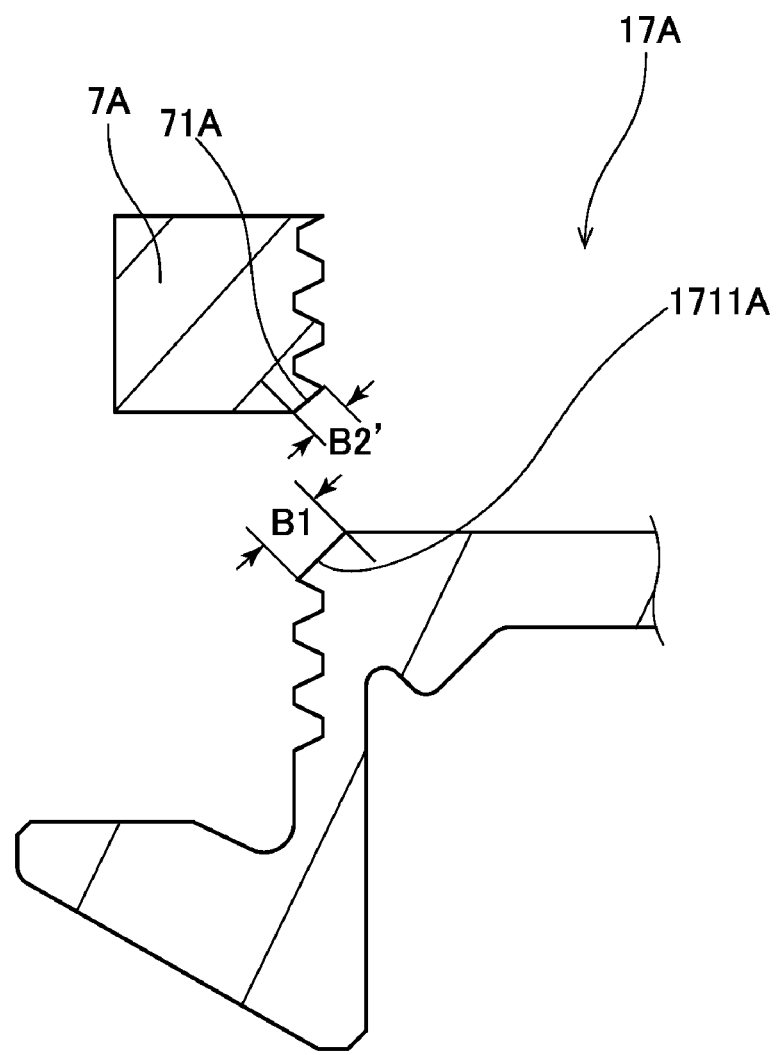
FIG. 7 is an example modification of FIG. 6.

FIG. 7 is an example modification of the preferred embodiment shown in FIG. 6. Referring to FIG. 7, the length B1 of a hub slanting surface 1711A is preferably longer than the length B2' of a clamper slanting surface 71A. The hub slanting surface 1711A, into which the clamper slanting surface 71A can be brought into contact, is accordingly large. This enables the clamper slanting surface 71A to be more securely mounted on the hub slanting surface 1711A. Thus, even if a clamper 7A is displaced from a proper position when the clamper 7A is mounted on a rotor hub 17A, a portion of the clamper slanting surface 71A and a portion of the hub slanting surface 1711A are easily brought into contact with each other. This enables the clamper 7A to be guided to a stable position on the rotor hub 17A.

In the modification of a preferred embodiment illustrated in FIG. 7, the arrangement makes more precise positioning possible when the clamper 7A is screwed to the rotor hub 17A. This enables the clamper 7A to be fitted to the rotor hub 17A with higher precision. This contributes to preventing the clamper 7A from being fitted to the rotor hub 17A in a tilted condition.

Note that, although the spindle motor according to the above-described preferred embodiments and modifications thereof is a motor of a so-called fixed-shaft type in which the shaft is stationary, this is not essential to the present invention. For example, a spindle motor according to a preferred embodiment of the present invention may be a motor of a so-called rotating-shaft type in which the shaft is rotating. That is, spindle motors according to preferred embodiments of the present invention may be either of the rotating-shaft type or of the fixed-shaft type.

Also note that, although the spindle motor according to the above-described preferred embodiment is preferably a so-called outer-rotor motor in which the magnet is arranged to rotate radially outside the stator, this is not essential to the present invention. For example, a spindle motor according to various preferred embodiments of the present invention may be a so-called inner-rotor motor in which the magnet is arranged to rotate radially inside the stator. That is, spindle motors according to preferred embodiments of the present invention may be either of an outer-rotor type or of an inner-rotor type.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

What is claimed is:

1. A spindle motor arranged to have a recording disk and a clamper mounted thereon, the spindle motor comprising:
    a rotating portion including a rotor hub and a rotor magnet including the rotor hub fixed thereto, and arranged to be rotatable about a central axis; and
    a stationary portion including a stator arranged opposite to the rotor magnet; wherein
    the rotor hub includes:
        a hub circular plate portion arranged to extend radially with respect to the central axis;
        a hub cylindrical portion arranged to extend axially downward from an outer circumferential portion of the hub circular plate portion; and
        a disk mount portion arranged to extend radially outward from the hub cylindrical portion;
    an outer circumferential portion of the hub cylindrical portion includes a hub screw portion arranged to have the clamper screwed thereto;
    the hub screw portion includes at least:
        a first hub screw groove;
        a first hub screw thread arranged to be adjacent to the first hub screw groove; and
        an upper flank and a lower flank arranged to together define the first hub screw thread;
    the outer circumferential portion of the hub circular plate portion includes a hub slanting surface arranged to connect with the first hub screw groove; and
    a length of the hub slanting surface is longer than a length of the upper flank.

2. The spindle motor according to claim 1, wherein an angle of inclination of the hub slanting surface with respect to the central axis is smaller than an angle of inclination of the upper flank with respect to the central axis.

3. The spindle motor according to claim 2, wherein the angle of the inclination of the hub slanting surface with respect to the central axis is about 35 or more degrees and about 65 or less degrees.

4. The spindle motor according to claim 2, wherein the angle of the inclination of the hub slanting surface with respect to the central axis is about 45 degrees.

5. The spindle motor according to claim 1, wherein the hub screw portion includes an upper connecting surface arranged to define a wall surface of the first hub screw groove, positioned on a lower side of the hub slanting surface, and arranged to connect with the hub slanting surface.

6. The spindle motor according to claim 5, wherein an axial dimension of the first hub screw thread is greater than an axial dimension of a thread defined by the hub slanting surface and the upper connecting surface.

7. The spindle motor according to claim 5, wherein an angle of inclination of the hub slanting surface with respect to the central axis is smaller than an angle of inclination of the upper connecting surface with respect to the central axis.

8. The spindle motor according to claim 1, wherein
the hub screw portion includes:
  a plurality of hub screw grooves including the first hub screw groove; and
  a plurality of hub screw threads including the first hub screw thread;
the hub screw grooves and the hub screw threads are defined in the hub cylindrical portion; and
each of a number of hub screw grooves and a number of hub screw threads is two, three, or four.

9. A disk drive apparatus comprising:
a recording disk;
the spindle motor of claim 1 arranged to rotate the recording disk;
a clamper fixed to the spindle motor to support the recording disk;
a head arranged to perform at least one of reading and writing of information from or to the recording disk;
a head actuator mechanism arranged to move the head relative to the recording disk and the spindle motor; and
a housing member arranged to surround the recording disk, the spindle motor, the head, and the head actuator mechanism.

10. A disk drive apparatus capable of having a recording disk mounted thereon, the disk drive apparatus comprising:
a spindle motor arranged to rotate the recording disk;
a clamper fixed to the spindle motor to support the recording disk;
a head arranged to perform at least one of reading and writing of information from or to the recording disk;
a head actuator mechanism arranged to move the head relative to the recording disk and the spindle motor; and
a housing member arranged to surround the recording disk, the spindle motor, the head, and the head actuator mechanism;
wherein
  the spindle motor includes:
    a rotating portion including a rotor hub and a rotor magnet having the rotor hub fixed thereto, and arranged to be rotatable about a central axis; and
    a stationary portion including a stator arranged opposite to the rotor magnet;
  the rotor hub includes:
    a hub circular plate portion arranged to extend radially with respect to the central axis;
    a hub cylindrical portion arranged to extend axially downward from an outer circumferential portion of the hub circular plate portion; and
    a disk mount portion arranged to extend radially outward from the hub cylindrical portion;
  an outer circumferential portion of the hub cylindrical portion includes a hub screw portion arranged to include the clamper screwed thereto;
  the hub screw portion includes at least:
    a first hub screw groove;
    a first hub screw thread arranged to be adjacent to the first hub screw groove; and
    an upper flank and a lower flank arranged to together define the first hub screw thread;
  the outer circumferential portion of the hub circular plate portion includes a hub slanting surface arranged to connect with the first hub screw groove;
  an inner circumferential portion of the clamper includes a clamper slanting surface; and
  a length of the hub slanting surface is substantially equal to or longer than a length of the clamper slanting surface.

11. The disk drive apparatus according to claim 10, wherein an angle of inclination of the hub slanting surface with respect to the central axis is equal or substantially equal to an angle of inclination of the clamper slanting surface with respect to the central axis.

12. The disk drive apparatus according to claim 11, wherein the angle of the inclination of the hub slanting surface with respect to the central axis is about 35 or more degrees and about 65 or less degrees.

13. The disk drive apparatus according to claim 11, wherein the angle of the inclination of the hub slanting surface with respect to the central axis is about 45 degrees.

14. The disk drive apparatus according to claim 10, wherein the hub screw portion includes an upper connecting surface arranged to define a wall surface of the first hub screw groove, positioned on a lower side of the hub slanting surface, and arranged to connect with the hub slanting surface.

15. The disk drive apparatus according to claim 14, wherein an axial dimension of the first hub screw thread is greater than an axial dimension of a thread defined by the hub slanting surface and the upper connecting surface.

16. The disk drive apparatus according to claim 14, wherein an angle of inclination of the hub slanting surface with respect to the central axis is smaller than an angle of inclination of the upper connecting surface with respect to the central axis.

17. The disk drive apparatus according to claim 10, wherein
the hub screw portion includes:
  a plurality of hub screw grooves including the first hub screw groove; and
  a plurality of hub screw threads including the first hub screw thread;
the hub screw grooves and the hub screw threads are defined in the hub cylindrical portion; and
each of a number of hub screw grooves and a number of hub screw threads is two, three, or four.

18. A spindle motor arranged to have a recording disk and a clamper mounted thereon, the spindle motor comprising:
a rotating portion including a rotor hub and a rotor magnet including the rotor hub fixed thereto, and arranged to be rotatable about a central axis; and
a stationary portion including a stator arranged opposite to the rotor magnet; wherein
the rotor hub includes:
  a hub circular plate portion arranged to extend radially with respect to the central axis;
  a hub cylindrical portion arranged to extend axially downward from an outer circumferential portion of the hub circular plate portion; and
  a disk mount portion arranged to extend radially outward from the hub cylindrical portion;
the hub circular plate portion includes a hub slanting surface arranged to extend obliquely radially inward and axially upward;
the hub cylindrical portion includes a hub screw portion arranged to have the clamper screwed thereto;
at least at a portion of a circumferential extent of the rotor hub, an outer end of an upper surface of the hub circular plate portion and an inner top end of the hub slanting surface are joined to each other; and
at least at a portion of the circumferential extent of the rotor hub, an outer bottom end of the hub slanting surface and an upper end of the hub screw portion are joined to each other.

19. A disk drive apparatus comprising:
a recording disk;

the spindle motor of claim 18 arranged to rotate the recording disk;

a clamper fixed to the spindle motor to support the recording disk;

a head arranged to perform at least one of reading and writing of information from or to the recording disk;

a head actuator mechanism arranged to move the head relative to the recording disk and the spindle motor; and a housing member arranged to surround the recording disk, the spindle motor, the head, and the head actuator mechanism.

20. The disk drive apparatus according to claim 19, wherein the clamper includes:

a clamper bottom portion arranged to extend radially;

a clamper inner circumferential surface that is cylindrical or substantially cylindrical and includes a clamper screw portion; and a clamper slanting surface arranged to extend obliquely radially inward and axially upward;

at least at a portion of a circumferential extent of the clamper, an inner end of the clamper bottom portion and an outer bottom end of the clamper slanting surface are joined to each other; and at least at a portion of the circumferential extent of the clamper, an inner top end of the clamper slanting surface and a lower end of the clamper screw portion are joined to each other.

21. The disk drive apparatus according to claim 20, wherein an angle of inclination of the hub slanting surface with respect to the central axis is equal or substantially equal to an angle of inclination of the clamper slanting surface with respect to the central axis.

\* \* \* \* \*